July 13, 1926.
M. W. BROWNE
1,592,718
COLD AIR CIRCULATION AND HUMIDITY CONTROL SYSTEM
Filed Nov. 1, 1923    3 Sheets-Sheet 1
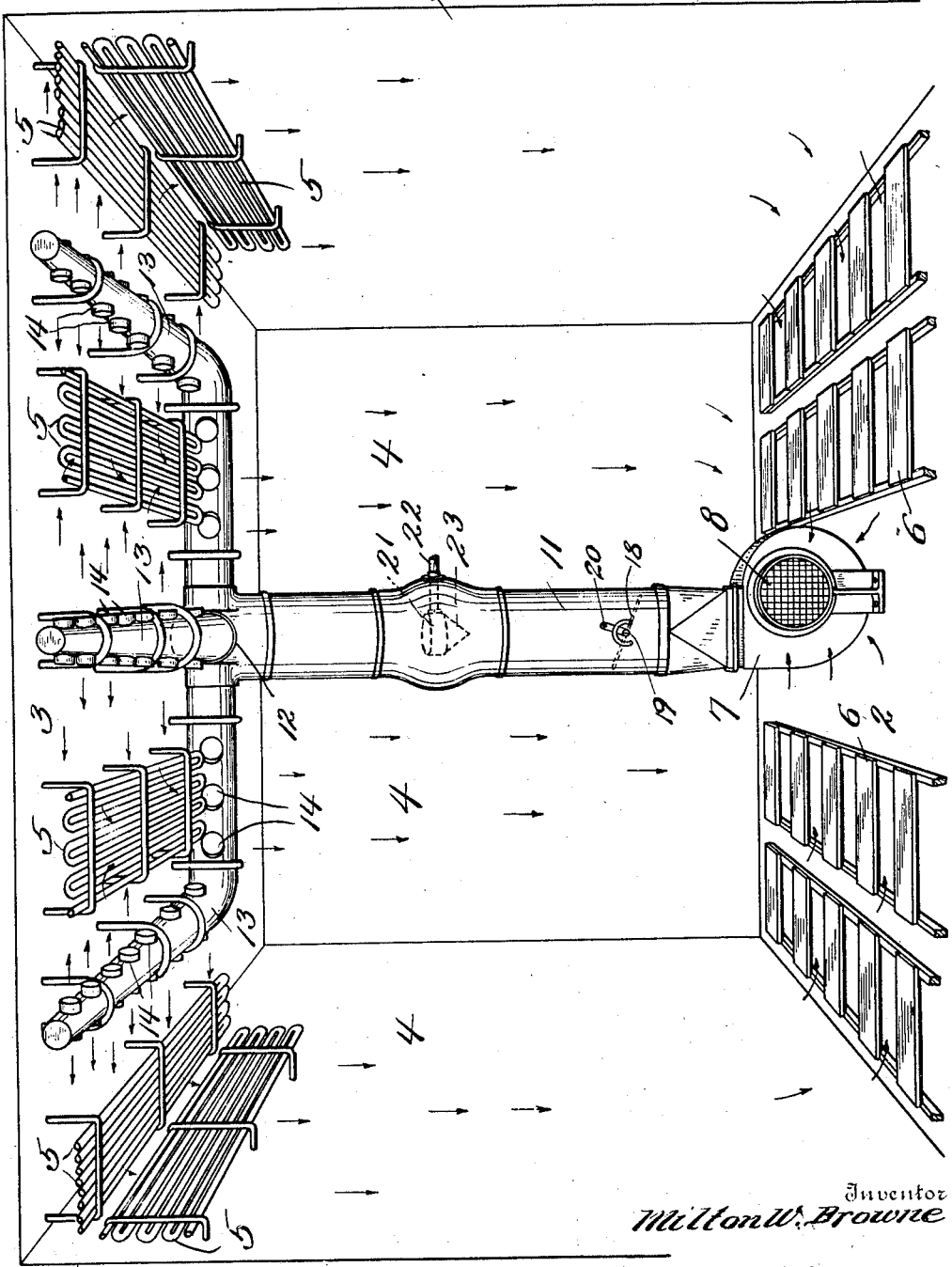

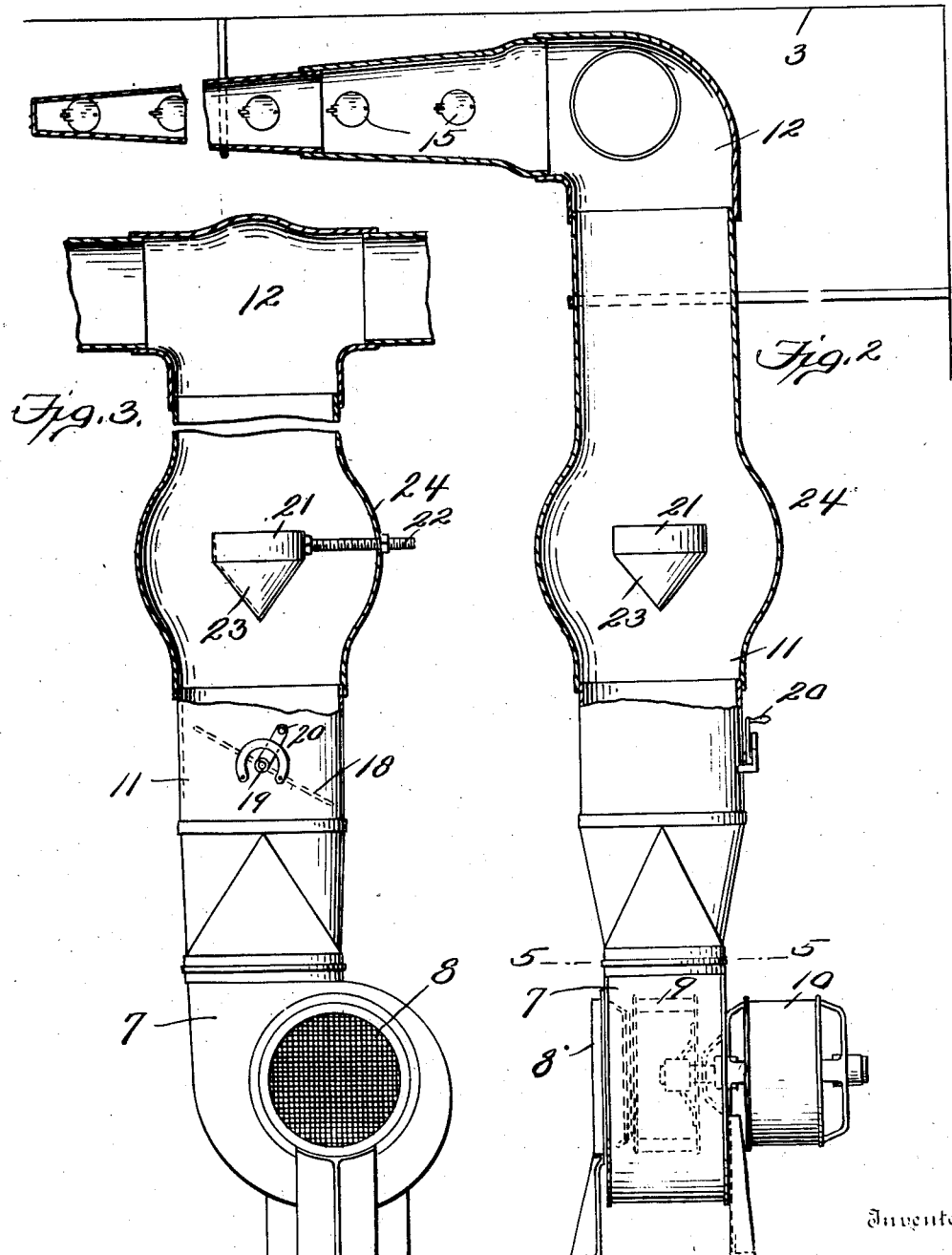

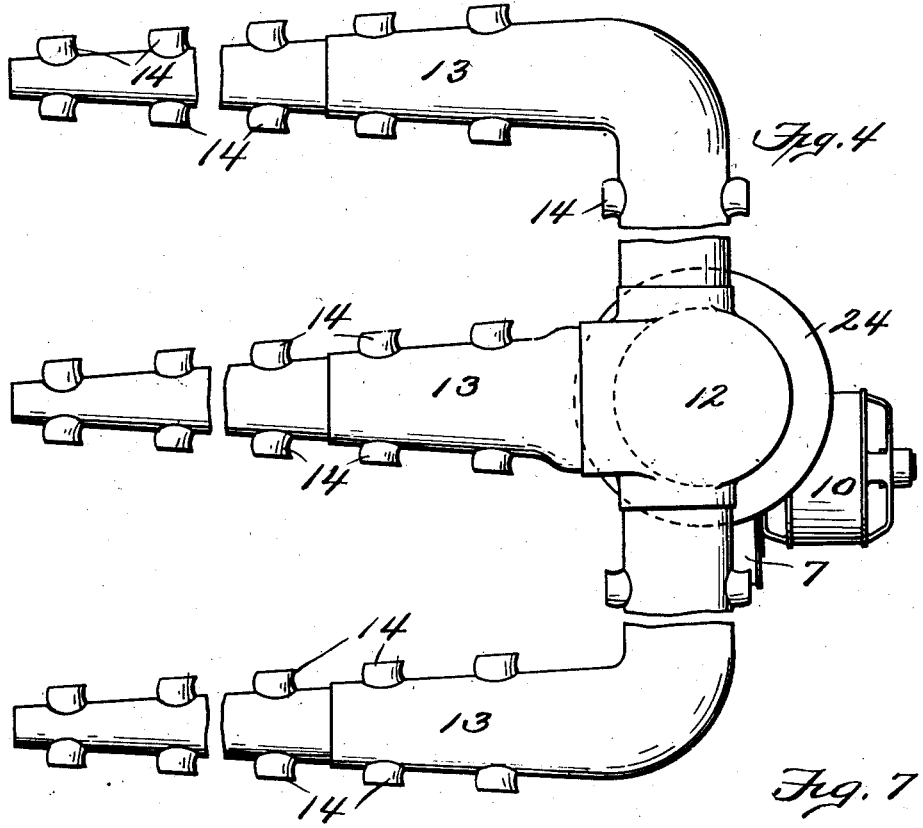

Patented July 13, 1926.

1,592,718

UNITED STATES PATENT OFFICE.

MILTON W. BROWNE, OF KANSAS CITY, MISSOURI.

COLD-AIR CIRCULATION AND HUMIDITY-CONTROL SYSTEM.

Application filed November 1, 1923. Serial No. 672,207.

The present invention relates to improvements in cold air circulation and humidity control systems, the same being especially applicable to cold storage warehouses and refrigerated rooms using artificial refrigeration, but also applicable to packaging houses for the preservation of meats, fruits and the like, candy factories and ocean steam ships having artificial refrigeration wherein perishable food products, such as meats, eggs, butter, milk products, fruits, vegetables and other food products are placed in storage for their preservation and conservation.

The system forming the subject-matter of the present invention is an improvement upon that disclosed in my Patent No. 1,515,546, granted Nov. 11, 1924, it being so constructed that higher efficiency in the operation of such a system may be attained, the perishable products undergoing refrigeration or storage may be preserved and conserved in better condition and for longer periods of time and other improved results in the operation of the system, as herein set forth, may be attained.

The primary object of the invention is to provide a novel and improved construction for systems of this character, whereby the temperature and the desired regulated cold air circulation within a cold storage or refrigerated room is maintained uniform, or substantially so, throughout all parts of the room, the humidity or moisture is so controlled that the accumulations of excess moisture and offensive odors in and about the products undergoing refrigeration or cold storage are prevented, and the proper relative humidity or moisture is maintained for the requirements of the perishable food products in storage.

Another object of the invention is to provide means whereby ample volume of pure air, thoroughly cleansed and cooled will be supplied uniformly throughout all parts of the room, it having been found that forced air circulation, when controlled, is very beneficial to all food products and particularly to meats, eggs, milk products, fruits and vegetables to prevent dampness which, even though the temperature may be low, causes a deterioration of such products while in cold storage or refrigerated rooms.

Another object of the invention is to provide means for the clarification and the changing of the air in cold storage or refrigerated rooms as often as may be desired or required for the various food products in storage, thereby providing pure fresh air, by circulation, throughout all parts of the room, thus controlling the humidity or moisture and removing the offensive gases and odors which may become mixed with the air, the invention thereby making it possible and practical to place various kinds of food products together in the same cold storage or refrigerated room, which has heretofore been impossible or impracticable on account of the penetrating gases and odors arising from certain fruits and vegetables which could not be controlled or removed from the cold storage or refrigerated rooms where gravity air circulation was wholly depended upon. Moreover, apple scald which is a cold storage disease which affects apples when stored in cold storage or refrigerated rooms, and which can not be prevented or controlled when gravity air circulation, heretofore used generally, is wholly depended upon, is prevented, it having been found that through properly controlled circulation of air and proper humidity or moisture control, the gases rising from the apples are removed and pure fresh air is supplied to the fruit, fresh air being essential to the prolongation of the life of the apple and necessary to avoid apple scald in cold storage.

Another object of the invention is to provide a system which will prevent the freezing of perishable food products at or near the floor level of the cold storage or refrigerated room, such occurring frequently in cold storage or refrigerated rooms wherein gravity air circulation is wholly depended upon, it being a well known fact that the colder air settles at the floor and has heretofore caused severe losses and damage to food products.

Another object of the invention is to provide a system whereby excessive losses of fruits and vegetables through shrinkage and decay is prevented and their ripening processes are retarded so that the lives of fresh fruits and vegetables are prolonged, in consequence of which it is made possible to store these and other food products in cold storage and refrigerated rooms for much longer periods than has been heretofore possible, and, moreover, the flavor, weight and other natural qualities of the products are not impaired so that these products will be preserved substantially without change or loss.

A further object of the invention is to provide a system which is capable of removing the excess wet air in packing houses and of providing a cold dry air system of regulated forced air circulation and humidity or moisture control, whereby the air rising from the meat will be absorbed quickly and its temperature promptly lowered, thus avoiding the accumulation of dampness at the ceiling and on the floors of meat storage rooms. It has been found that dampness without regard to temperature is an obstacle to effective refrigeration in a cold storage or refrigerated room, as it causes both fresh and smoked meats to mold with consequent ruin of such products.

The present invention provides an improved system which renders it possible to safely and successfully carry in cold storage and refrigerated rooms for a definite length of time, meats, eggs, fruits, vegetables and other food products, it insuring the uniform maintenance of proper temperatures and humidity or moisture in and around the products by a regulated circulation of dry cold air which is essential for the preservation of perishable food products because it is a part of the process which purifies the cold air and at the same time maintains uniform temperature and humidity throughout all parts of the cold storage or refrigerated room, these conditions being essential for the successful conservation of food products under refrigeration.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 represents a vertical section through a cold storage or refrigerated room, the same being equipped with a system constructed in accordance with the present invention;

Figure 2 is a view partly in section and partly in elevation, of the main air conduit and distributing pipe, these parts being viewed from the right in Figure 1;

Figure 3 is a view partly in elevation and partly in section of the main air conduit, the air-circulating means and the connection of the main conduit with the distributing pipes.

Figure 4 is a top plan view of the air-circulating means as shown in Figure 1;

Figure 5 represents a horizontal cross section through the main air conduit, taken on the line 5—5 of Figure 2;

Figure 6 represents, on an enlarged scale, a cross section through one of the air-distributing pipes showing the outlets therein and the dampers controlling them; and Figure 7 represents a horizontal section on the line 7—7 of Figure 6.

Similar parts are designated by the same reference characters in the several views.

The present invention is applicable generally to cold storage or refrigerated rooms. It may be installed in any cold storage warehouse or refrigerated room without requiring extensive alterations in such cold storage or refrigerated rooms and carrying in storage under refrigeration, perishable food products of various kinds and varieties which require a certain amount of cold air circulation, the proper relative humidity or moisture and the correct uniform temperature for their preservation.

Heretofore gravity air circulation alone has been generally depended upon for the circulation or distribution of air within cold storage warehouses or refrigerated rooms, but it has been found that in the circulation of cold air wholly by gravity, excessive moisture and, in consequence, uneven and varying temperatures occur at the floor level, the ceiling and in other parts of the room; also that in gravity circulating systems cold air, due to its greater weight, accumulates at or near the floor level of the room, often causing freezing of food products at this point, while the warmer and hence lighter air rises to the ceiling, where condensation occurs, producing dampness and the accumulation of excessive moisture which causes mold and deterioration of food products; and that in using gravity circulation the air between the floor and ceiling does not circulate by gravity sufficiently to supply the perishable fruits and vegetables with the proper volume of air. Furthermore, in gravity circulation systems, the temperature in different parts of the room is irregular, it varying several degrees in temperature, there being relatively warm dead air pockets in the corners as well as in the upper portion of the room, while the temperatures at or near the floor level will often be several degrees below the correct or desired temperature for the safe and successful storage of food products. Consequently, in such cold storage or refrigerated rooms depending wholly upon gravity air circulation as heretofore used, the length of the period during which food products, especially meats, eggs, fruits and vegetables can be successfully stored is relatively short, and often the storage of food products under such conditions is very unsatisfactory, it resulting in losses of food products, as well as in the weight, flavor and other natural qualities of the products under refrigeration.

The present invention provides a system which is so constructed that it is capable of maintaining as nearly as possible an even uniform temperature and humidity throughout all parts of the room, and more particularly it is capable of removing the offensive gases and odors which may become mixed with the warmer air accumulating at and near the upper part of the cold storage or refrigerated room. In the accompanying drawings which illustrate the preferred embodiment of the invention, 1 represents a cold storage or refrigerated room which, as is usual, is unobstructed interiorly to form an undivided chamber, it having a floor 2, ceiling 3 and walls 4, the room being air and water tight and preferably insulated in any suitable or well known way, as, for example, by several layers of corkboard or other well known non-heat conducting materials, so that the interior of the room will be protected from all exterior atmospheric and other conditions and will avoid the escape of cold air from the interior of the room. Refrigerating pipes or coils 5 are arranged in the upper portion of the room adjacent to the ceiling thereof, these pipes or coils being connected to a suitable artificial refrigerating system, such, for example, as a brine or ammonia system. These refrigerating pipes or coils are preferably arranged in groups in parallel rows, it being preferable to arrange the refrigerating pipes or coils immediately below the ceiling 3 and on the upper portions of the opposite side walls 4. Racks or false floors 6 are preferably provided which rest on the floor 2 of the room and serve to support the products to be refrigerated or stored, these racks providing spaces beneath, up, through and around the product for the free circulation of air.

The means shown in the present instance for creating forced regulated air circulation and for controlling humidity or moisture within the cold storage or refrigerated room, as well as to afford adequate air circulation for the products in cold storage, comprises preferably a housing 7 which is located at or near the floor level 2 of the room and has an air induction opening 8 through which the cold air at or near the floor level 2 is forcibly drawn into the apparatus by a fan 9 of suitable capacity, it being preferable to employ a centrifugal fan of a suitable type driven by an electric motor 10, which latter may be located exteriorly of the casing 7. The air drawn into the inlet or induction opening 8 is forced out of the fan casing 7 upwardly into and through an upright main air conduit 11 which extends to a point near the ceiling of the room and is provided at its upper end with a fitting 12 to which a suitable number of air distributing pipes 13 are connected. The branch or distributing pipes 13 are arranged longitudinally between the groups or rows of refrigerating pipes or coils 5 and they are provided in their opposite sides with laterally-extending outlets 14 which are on the same level with and are directed toward the respective refrigerating pipes or coils which are opposite thereto. The outlets 14 serve to discharge air received by the distributing pipes 13 from the main air conduit 11 on to and past the refrigerating pipes or coils, whereby such air is reduced to the proper refrigerating temperature. In order to produce uniform refrigeration of the air discharged from the pipes 13 so that the air will have a uniform refrigerating temperature, each of the air-distributing pipes 13 is tapered or reduced in diameter, proceeding in a direction from its point of connection with the main air conduit 11 toward the free end of the distributing pipe, which end is preferably closed, as shown, the tapering of the distributing pipe being such as to equalize the pressure of the air at the various outlets 14 throughout the length of the distributing pipe so that the same amount of air will be discharged from each outlet. For example, in using a distributing pipe in which the outlets 14 have round holes therein which are four inches in diameter and are spaced apart fourteen feet along the length of the distributing pipe, the end of the distributing pipe which is connected to the fitting 12 may be twelve inches in diameter and the distributor pipe may taper gradually to a four-inch diameter at its terminal end. Furthermore, to enable uniform distribution of air from the outlet of the distributing pipes, each outlet is provided with a damper 15 which is adjustable to control the amount of air discharged from each outlet 14. Preferably, each damper is so mounted within the distributing pipe that it may, when opened, more or less, act as a shield to deflect part of the air travelling longitudinally of the distributing pipe from the inside of the distributing pipe through the outlet thereof.

For example, as shown, a damper is used which is hinged at the edge thereof which is nearest the terminal end of the distributing pipe, so that the damper may swing from the full line position shown in Figure 7 to or toward the dotted line position indicated in that figure, and a suitable retaining device is preferably used for holding the damper in adjusted position, a lever 16 being used for that purpose in the present instance which is pivotally connected to the damper and has a notched lower edge to cooperate with a fastening 17. By appropriately setting the dampers of the various outlets in the distributing pipes, the discharge of air from the distributing pipes on to the refrigerating pipes or coils may be so regulated as to produce a uniform circulation of air at a uniform or even temperature. The structure described is capable of producing and maintaining a continuous uniform circulation of clarified air refrigerated or cooled to an even refrigerating temperature, this continuous circulation of air being maintained in the paths indicated by the arrows in Figure 1, so that even or uniform temperature and humidity are maintained throughout all parts of the room. In consequence, the cold air at or near the floor level is forcibly drawn into the induction opening 8 and after being forced upwardly in the upright main air conduit 11 enters the distributing pipes 13 and is projected from the outlets 14, at or near the ceiling of the room, against the groups of refrigerating pipes or coils, whereby the air is cooled, it is dried or freed of excessive moisture and impurities absorbed by the moisture are taken from the air by the freezing of the moisture on the refrigerating pipes or coils, after which the cooled, dried and purified air gravitates by reason of its increased density to the floor of the room, to be taken up again by the air forcing apparatus, so that a continuous circulation of regulated cold air of proper humility is maintained. In this manner the fruits and vegetables in cold storage, which are living organisms, are sufficiently aerated at all times, thus prolonging their lives, and there is no opportunity for excess moisture or dampness to accumulate in or about the products and hence spoilage and deterioration, due to mold or other causes, is prevented. Furthermore, the maintenance of an equal temperature throughout all parts of the cold storage or refrigerated room is attained, and hence no warm air pockets can form, nor can an abnormally low temperature exist at or immediately above the floor.

The air forcing fan is of a size to give it the necessary capacity to conform with the size of the room, and it operates continuously while the system is in use. A damper 18 is preferably mounted in the main air conduit 11 to enable the volume of air in circulation to be regulated. This damper may be of the pivoted type supported on a shaft 19 and provided with a handle 20 exteriorly of the casing 11 by which it may be adjusted and held in adjusted position. This damper is capable of regulating the volume of air in circulation, without reducing or interfering with the speed of the motor 10. When occasion demands, as in the storage of eggs, it is necessary to increase the humidity or moisture of the circulating air to avoid losses by shrinkage of the product, and any deficiency in humidity or moisture can be supplied by a water pan 21 which may be mounted within the main air conduit 11 and supplied with water through a pipe 22 or in any other suitable way. The underside of the pan is preferably formed with a conical or similar sloping surface 23 for the purpose of splitting the air column forced upwardly within the conduit 11, and in order to further avoid obstruction to the ascending column of air by this water pan when the latter is used in the manner set forth, the walls of the conduit 11 opposite to the water pan may be bulged outwardly, as at 24.

It has been found that by using a forced regulated air circulation and humidity control system constructed substantially as herein shown and described, the desired air circulation to and from all parts of the cold storage or refrigerated room is maintained continuously. This controlled circulation of air carries off from meats, eggs, fruits, vegetables and other food products the excessive moisture, offensive and penetrating odors, carbon dioxide and the like and gives these perishable food productss the desired circulation of clarified air which they absorb and which prolongs their lives, thus enabling such food products to be stored without deterioration much longer than is possible with the systems heretofore used generally and which depend wholly upon gravity for air circulation. Moreover, the regulated forced circulation of air prevents accumulation of excessive moisture in or about the food products, so that dampness, mold or similar destructive influences which, when systems depending wholly upon gravity are used, cause rapid deterioration of the products, are avoided. Furthermore, by reason of the regulated forced circulation of cold air, uniform temperatures and proper relative humidity are maintained throughout all parts of the cold storage or refrigerated room, so that all products stored therein may be subjected to the same uniform and most efficient refrigerating temperature and the requisite relative humidity, thus preventing wilting because of insufficient moisture and mold or decay because of excessive humidity, and preserving the natural flavor as well as preventing loss of weight of the food products.

The present invention enables all food products to be stored more successfully and for longer periods of time than is possible with the gravity systems heretofore used. This is particularly true of fresh fruits and vegetables as well as meats, eggs and milk products which have heretofore given much trouble to many cold storage concerns, owing to the difficulties presented in storing them under the gravity systems, the difficulty being due to the inability of the gravity system to take up the bad odors and to maintain the proper relative humidity and uniform temperatures, as well as to provide the requisite air circulation in and about the products, in consequence of which eggs, when stored heretofore under the gravity system have absorbed deleterious flavors to the extent that they have been made unfit for human consumption. Whenever insufficient humidity exists, meats, eggs, fruits, vegetables and other food products will undergo excessive shrinkage in weight. On the other hand, if the humidity is excessive these products will mold and they deteriorate very rapidly. The present invention enables all such defects and disadvantages to be avoided as it insures the maintenance of uniform temperature, the proper relative humidity and the proper air circulation in and around the products, and throughout all parts of the cold storage or refrigerated room.

I claim as my invention:—

1. In a refrigerated or cold storage room having refrigerating pipes extending across the upper portion thereof and having a clear space beneath them for the descent of refrigerated air, and means for forcibly drawing air from the lower portion of the room and forcing it to the upper portion thereof, distributing pipes connected to receive such air and extending across the upper portion of the room opposite said refrigerating pipes, the distributing pipes having laterally directed outlets arranged to project air against the refrigerating pipes, and the distributing pipes being tapered to equalize the volume of air discharged from the different outlets along its length.

2. In a refrigerated or cold storage room having rows of refrigerating pipes extending across the upper portion thereof, and means for drawing air from the lower portion of the room and forcing it to the upper portion thereof, rows of air distributing pipes extending across the upper portion of the room between the rows of refrigerating pipes and connected to receive air forced to the upper portion of the room, said pipes having laterally extending outlets spaced longitudinally in their opposite sides and directed towards the adjacent rows of refrigerating pipes, and dampers individual to said outlets for regulating the air discharged therefrom.

3. In a refrigerated or cold storage room comprising rows of refrigerating means located in the upper portion thereof and having a clear space beneath them for the descent by gravity of air refrigerated thereby, and a conduit having an inlet located at or adjacent to the floor of the room, a distributing pipe connected to the upper end of said conduit and located between the rows of refrigerating means, the distributing pipe having rows of laterally extending outlets in its opposite sides for projecting air therefrom against the respective refrigerating means, dampers individual to said outlets for regulating the discharge of air therefrom, a fan operative to draw air from the room at and near the floor level thereof and for forcing such air upwardly through said conduit and distributing pipe and out through the outlets in the latter, and a damper in said conduit for regulating the total volume of air delivered by the conduit to the distributing pipe.

4. A refrigerated or cold storage room having refrigerating pipes in the upper portion thereof, means for drawing air from the lower portion and forcing it to the upper portion of the room, air-distributing pipes connected to receive air forced to the upper portion of the room and having outlets arranged to direct air onto the refrigerating pipes, and regulating dampers controlling the delivery of air from the respective outlets, said dampers being operative to deflect air travelling longitudinally within the distributing pipe laterally through the respective outlets.

5. In combination with a refrigerated or cold storage room comprising refrigerating means located in the upper portion thereof, an upright air conduit and fan for drawing air from the lower portion of the room, and distributing pipes for discharging the air against the refrigerating means in the upper portion of the room, and a water pan arranged relatively to said air conduit to cause the air drawn into the conduit to pass over the surface of a body of water contained in the pan.

In testimony whereof I have hereunto set my hand.

MILTON W. BROWNE.